(12) United States Patent
Nakamura et al.

(10) Patent No.: US 8,418,789 B2
(45) Date of Patent: Apr. 16, 2013

(54) COOLING SYSTEM, VEHICLE EQUIPPED WITH THE COOLING SYSTEM, AND METHOD FOR CONTROLLING THE COOLING SYSTEM

(75) Inventors: Kimihito Nakamura, Toyota (JP);
Yoshiaki Kikuchi, Toyota (JP);
Masahito Suzuki, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 677 days.

(21) Appl. No.: 12/641,910

(22) Filed: Dec. 18, 2009

(65) Prior Publication Data
US 2010/0155162 A1 Jun. 24, 2010

(30) Foreign Application Priority Data
Dec. 19, 2008 (JP) ................................. 2008-324549

(51) Int. Cl.
*B60W 10/26* (2006.01)
(52) U.S. Cl.
USPC .......... 180/68.1; 180/65.29; 318/473; 429/62
(58) Field of Classification Search ................ 180/68.1, 180/68.2, 65.29; 318/473; 429/62
See application file for complete search history.

(56) References Cited

U.S. PATENT DOCUMENTS

| 5,834,132 | A * | 11/1998 | Hasegawa et al. | 429/62 |
| 7,102,310 | B2 * | 9/2006 | Ishishita | 318/268 |
| 7,767,354 | B2 | 8/2010 | Saito et al. | |
| 8,104,435 | B2 * | 1/2012 | Schwartz et al. | 123/41.12 |
| 8,219,248 | B2 * | 7/2012 | Aridome et al. | 700/275 |
| 2005/0257546 | A1 * | 11/2005 | Ishishita | 62/236 |
| 2006/0055242 | A1 * | 3/2006 | Lee | 307/10.1 |
| 2009/0167228 | A1 * | 7/2009 | Chung et al. | 318/455 |

FOREIGN PATENT DOCUMENTS

| JP | 2003178815 A | 6/2003 |
| JP | 2005184979 A | 7/2005 |
| JP | 2007-200780 A | 8/2007 |
| WO | WO-2008136448 A1 | 11/2008 |

OTHER PUBLICATIONS

WO 2007/086231, Aridome K et al., "Control fan control device and method." Aug. 2, 2007.*
Japanese Office Action issued May 10, 2011 in JP2008-324549 and translation.

* cited by examiner

*Primary Examiner* — John Walters
*Assistant Examiner* — Brian Swenson
(74) *Attorney, Agent, or Firm* — Gifford, Krass, Sprinkle, Anderson & Citkowski, P.C.

(57) ABSTRACT

A fan motor is controlled via a switching circuit from the moment when a cooling fan control routine is started until the moment when the rotational speed of the fan motor reaches a control-switching speed so that the higher the detected auxiliary battery voltage is when the cooling fan control is started, the lower the command duty ratio that is set. Accordingly, it is possible to activate the fan motor more reliably and to avoid generating excessive operating noise by the cooling fan when the fan motor is activated.

8 Claims, 7 Drawing Sheets

COOLING SYSTEM, VEHICLE EQUIPPED WITH THE COOLING SYSTEM, AND METHOD FOR CONTROLLING THE COOLING SYSTEM

INCORPORATION BY REFERENCE

The disclosure of Japanese Patent Application No. 2008-324549 filed on Dec. 19, 2008, including the specification, drawings and abstract is incorporated herein by reference in its entirety.

BACKGROUND OF THE INVENTION

1. Field of Invention

The present invention relates to a cooling system, a vehicle equipped with the cooling system, and a method for controlling the cooling system.

2. Description of Related Art

A system that is mounted on a vehicle and that uses a fan for cooling a battery has been described in which, if the temperature of the battery is equal to or below a specified maximum threshold temperature, the fan is driven while the control duty ratio that is required based on the temperature and the heat generation amount of the battery is limited to maintain an acceptable noise level of the operating noise of the fan in accordance with the vehicle speed (for example, see Japanese Patent Application Publication No. 2003-178815 (JP-A-2003-178815)). In another example of a battery cooling system of this type, the fan is driven using a duty ratio that is determined in view of noise based on the vehicle speed and the engine speed as well as the temperature of the battery (for example, see Japanese Patent Application Publication No. 2005-184979 (JP-A-2005-184979)).

In the cooling systems described above, reliable activation of the fan is necessary when a target object such as a battery should be cooled. However, if the duty ratio used to activate the fan is set high to allow reliable activation of the fan, the rotational speed of the fan may be excessive, resulting in excessive operating noise.

SUMMARY OF THE INVENTION

A cooling system, a vehicle equipped with the cooling system, and a method for controlling a cooling system of the present invention more reliably activates a blower, such as an electric fan, and avoids generating excessive operating noise when the blower is activated.

A first aspect of the present invention relates to a cooling system, including: a power source; and an electric fan that is driven by electric power from the power source and that blows air to cool a target object. The cooling system also includes a switching device that is connected to the power source and the electric fan; a voltage detection device that detects the voltage of the power source; and a control device that controls the switching device so that air is supplied from the electric fan when the target object is cooled and controls the switching device from the moment when an activation condition for the electric fan is satisfied until the moment when a cancellation condition is satisfied so that the higher the detected voltage is when the activation condition is satisfied, the lower the duty ratio is set.

According to the cooling system, the effective voltage of the electric power to drive the electric fan is sufficient to prevent the output torque when the electric fan is activated from being too low, even if the voltage of the power source is relatively low, when the activating condition for the electric fan is satisfied, and the effective voltage of the electric power to drive the electric fan is low enough to prevent the output torque when the electric fan is activated from increasing too high, even if the voltage of the power source is relatively high, when the activating condition for the electric fan is satisfied. Therefore, the cooling system of the present invention can more reliably activate the electric fan and avoid generating excessive operating noise of the electric fan, due to an excessive increase of the rotational speed of the electric fan, immediately after the activation of the electric fan.

The cooling system of the present invention may further include: a temperature obtaining device that obtains the temperature of the target object; and a setting device that sets a target rotational speed for the electric fan based on the obtained temperature. The activation condition may be satisfied when the obtained temperature is at least equal to a prescribed temperature. The cancellation condition may be satisfied when the rotational speed of the electric fan reaches a prescribed rotational speed that is lower than the target rotational speed. Also, in this cooling system, the control device may set a duty ratio that becomes the rotational speed of the electric fan equal to the set target rotational speed after the cancellation condition has been satisfied and may control the switching device based on the set duty ratio. In this way, it is possible to avoid generation excessive operating noise due to an excessive increase in the rotational speed of the electric fan immediately after the activation of the electric fan, and the rotational speed of the electric fan may be reached at a target rotational speed quickly after the rotational speed has increased to a certain extent.

A vehicle may be equipped with any one of the cooling systems described above, and may have an electric motor that outputs power for running; and an electric storage device, as the target object, that is capable of supplying electric power to and accepting electric power from the electric motor. Because the vehicle of the present invention is equipped with a cooling system according to any one of the aspects of the present invention described above, provides the same effects as those of the cooling system of the present invention, including the effect that the generation of excessive operating noise immediately after the activation of the electric fan may be avoided, and thereby does not annoy the passengers.

A second aspect of the present invention relates to a method for controlling a cooling system. The control method includes: controlling a switching device that is connected to a power source and an electric fan, which is driven by electric power from the power source and capable of blowing air to cool a specific target object, so that air is supplied from the electric fan when a target object is cooled, and controlling the switching device from the moment when an activation condition for the electric fan is satisfied until the moment when a predetermined cancellation condition is satisfied so that the higher the detected voltage is when the activation condition is satisfied, the lower the duty ratio is set.

According to the method for controlling a cooling system, the effective voltage of the electric power driving the electric fan is high enough to prevent the output torque when the electric fan is activated from being insufficient even if the voltage of the power source is relatively low when the activating condition for the electric fan is satisfied. In addition, the effective voltage of the electric power is low enough to prevent the output torque when the electric fan is activated from increasing excessively even if the voltage of the power source is relatively high when the activating condition for the electric fan is satisfied. Therefore, the method for controlling a cooling system of the present invention more reliably activates the electric fan and avoid generating excessive operating noise of the electric fan due to an excessive increase of the rotational speed of the electric fan at the time of the activation of the electric fan.

A third aspect of the present invention relates to a cooling system, including: a power source; a blower that is driven by electric power from the power source and blows air to cool a target object; and a voltage detection device that detects a voltage of the power source. The cooling system also has a control device that determines whether the target object is cooled, and, if it is determined that the target object is cooled, activates the blower and controls a duty ratio for the current to be supplied to the blower from the power source from when the activation of the blower is started until when a predetermined condition is satisfied so that the higher the detected voltage is when the activation condition is satisfied, the lower the duty ratio is set.

A fourth aspect of the present invention relates to a method for controlling a cooling system. The control method includes the steps of: determining whether a target object is cooled; activating a blower to supply air to the target object if it is determined that the target object is cooled; and controlling a duty ratio of the current supplied to the blower from the power source from when the blower is activated until the moment when a predetermined condition is satisfied such that the higher the detected voltage is when the activation condition is satisfied, the lower the duty ratio is set.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
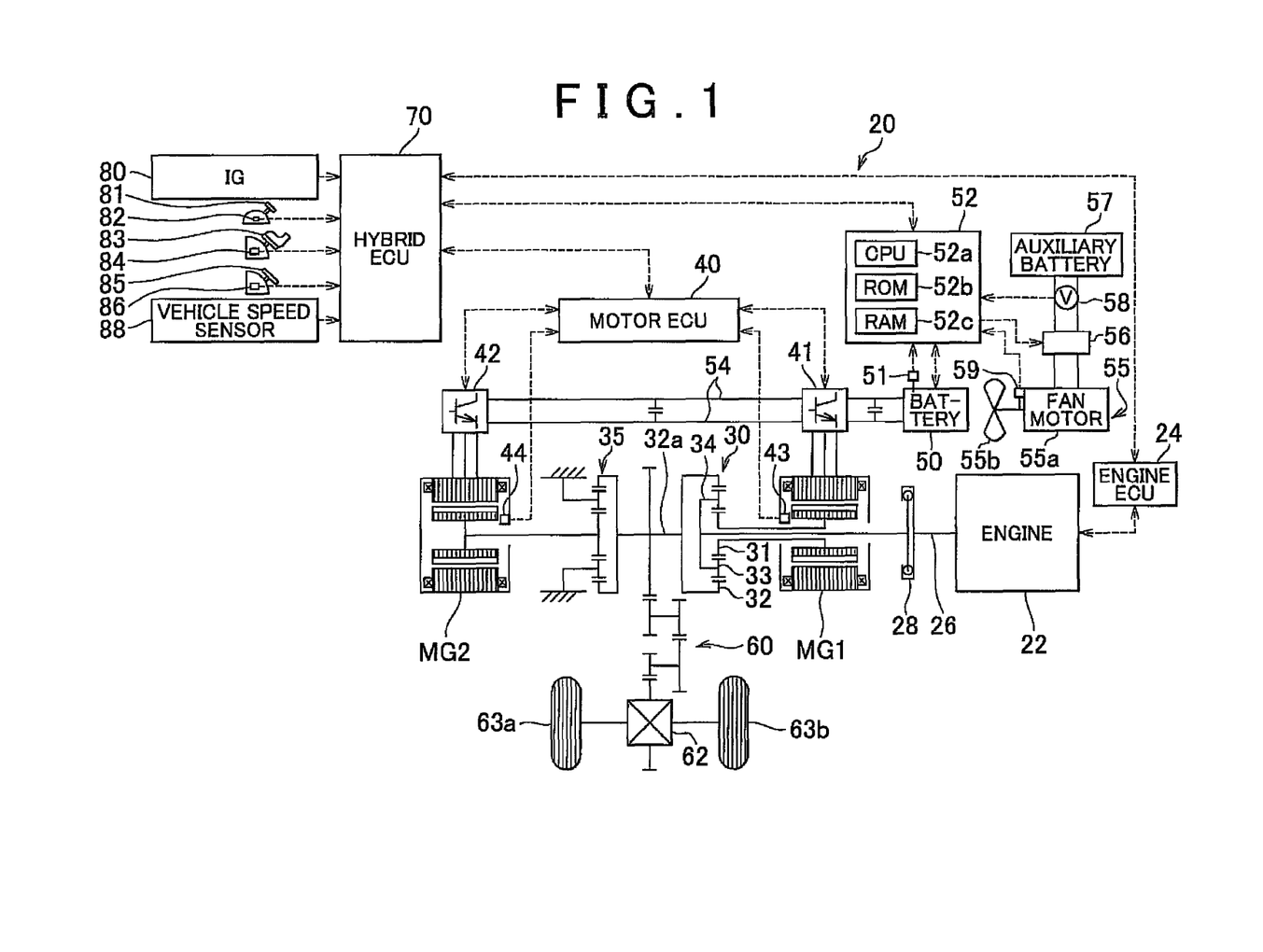
FIG. 1 is a schematic diagram that illustrates an overview of the configuration of a hybrid vehicle 20 equipped with a cooling system according to an embodiment of the present invention.

FIG. 1 is a configuration diagram that illustrates an overview of the configuration of a hybrid vehicle 20 equipped with a cooling system according to an embodiment of the present invention. The hybrid vehicle 20 of this embodiment includes an engine 22; a three-shaft type power distribution-integration mechanism 30 that is connected to a crankshaft 26 (output shaft) of the engine 22 via a damper 28; a motor MG1 that is connected to the power distribution-integration mechanism 30 and is able to generate electric power; a reduction gear 35 that is attached to a ring gear shaft 32a connected to the power distribution-integration mechanism 30; a motor MG2 that is connected to the reduction gear 35; a battery 50 that is exchanges electric power with the motors MG1 and MG2; an electric cooling fan 55 that cools the battery 50; a battery electronic control unit (which is hereinafter referred to as "battery ECU 52") that manages the battery 50 and controls the cooling fan 55; and a hybrid vehicle electronic control unit (which is hereinafter referred to as "hybrid ECU") 70 that controls the entire hybrid vehicle 20.

The engine 22 is an internal combustion engine that outputs power using a hydrocarbon type fuel such as gasoline or diesel fuel, and is subjected to various operation controls such as a fuel injection control, an ignition control, and an intake air amount adjusting control, by an engine electronic control unit (which is hereinafter referred to as "engine ECU") 24. The engine ECU 24 receives signals from various sensors that detect operating conditions of the engine 22, including a crank position from a crank position sensor (not shown) that detects the crank angle of the crankshaft 26 of the engine 22. The engine ECU 24, which communicates with the hybrid ECU 70, controls the operation of the engine 22 according to a control signal from the hybrid ECU 70 and, as needed, outputs data on the operation conditions of the engine 22 to the hybrid ECU 70.

The power distribution-integration mechanism 30 includes a sun gear 31, which is an external gear; a ring gear 32, which is an internal gear, disposed concentrically with the sun gear 31; a plurality of pinion gears 33 that mesh with the sun gear 31 and the ring gear 32; and a carrier 34 that supports the plurality of pinion gears 33 for both rotation on their own axes and orbital movement. The power distribution-integration mechanism 30 is constituted as a planetary gear mechanism that functions as a differential gear using the sun gear 31, the ring gear 32 and the carrier 34 as rotational elements. The carrier 34 of the power distribution-integration mechanism 30 is connected to the crankshaft 26. The sun gear 31 is connected to the motor MG1. The ring gear 32 is connected to the reduction gear 35 via the ring gear shaft 32a. The power distribution-integration mechanism 30 distributes the power from the engine 22 via the carrier 34 into the sun gear 31 and the ring gear 32 in accordance with the gear ratio therebetween when the motor MG1 functions as a power generator, and integrates the power from the engine 22 via the carrier 34 and the power from the motor MG1 via the sun gear 31 and outputs the integrated power to the ring gear 32 when the motor MG1 functions as an electric motor. The power that is output to the ring gear 32 is then eventually output from the ring gear shaft 32a via a gear mechanism 60 and a differential gear 62 to the driving wheels 63a and 63b of the vehicle.

The motors MG1 and motor MG2, which may be conventional synchronous generator—motors that may be driven as a power generator and also driven as an electric motor, supply electric power to and accept electric power from the battery 50 via inverters 41 and 42. Electric power lines 54 connecting the inverters 41 and 42 with the battery 50 are constituted as a positive bus line and a negative bus line that are shared by the inverters 41 and 42, so that electric power generated by either the motor MG1 or MG2 may be used by the other motor. Therefore, the battery 50 is charged by electric power generated by the motor MG1 or MG2 and discharged to provide supplemental electric power to the motor MG1 or MG2. When the supply and consumption of electric power are balanced by the motors MG1 and MG2, the battery 50 is neither charged nor discharged. The driving of both the motors MG1 and MG2 is controlled by a motor electronic control unit (which is hereinafter referred to as "motor ECU")

40. The motor ECU 40 receives signals necessary to control the driving of the motors MG1 and MG2, such as signals from rotational position detection sensors 43 and 44 that detect the rotational positions of rotors of the motors MG1 and MG2 and phase currents that are applied to the motors MG1 and MG2 and detected by current sensors (not shown), and outputs switching control signals to the inverters 41 and 42. The motor ECU 40 communicates with the hybrid ECU 70 to appropriately control the driving of the motors MG1 and MG2 in accordance with a control signal from the hybrid ECU 70 and, as needed, outputs data on the operation conditions of the motors MG1 and MG2 to the hybrid ECU 70.

The cooling fan 55 includes a fan motor 55a, which is, for example, a DC brushless motor, and fan blades 55b that is attached to the rotating shaft of the fan motor 55a. The cooling fan 55 draws air to cool the battery 50 by rotating the fan blades 55b. The fan motor 55a is connected to an auxiliary battery 57, which may be a lead battery having a rated output voltage of 12 V, via a switching circuit 56, and is duty-controlled by switching of the switching circuit 56.

The battery ECU 52 is a microprocessor that includes a CPU 52a, a ROM 52b that stores a processing program and various maps, a RAM 52c that temporarily stores data, and input output ports (not shown). The battery ECU 52 manages the battery 50, and controls the fan motor 55a via the switching circuit 56. The battery ECU 52 receives signals necessary to manage the battery 50, such as an interterminal voltage from a voltage sensor (not shown) that is connected to the battery 50, a charge-discharge current from a current sensor (not shown) attached to the electric power lines 54 connected to the battery 50, and a battery temperature Tb from a temperature sensor 51 attached to the battery 50, and other signals that may be necessary to control the cooling fan 55, such as an auxiliary battery voltage Vb from a voltage sensor 58 connected between output terminals of the auxiliary battery 57, and a rotational speed Nfm of the fan motor 55a from a rotational speed sensor 59 attached to the fan motor 55a, via the input port. The battery ECU 52 outputs signals for controlling the cooling fan 55 such as, for example, a control switching signal to the switching circuit 56. The battery ECU 52 also outputs data regarding the conditions of the battery 50 to the hybrid ECU 70 as needed.

The hybrid ECU 70 is a microprocessor that includes a CPU (not shown) as a major component, a ROM (not shown) that stores a processing program, a RAM (not shown) that temporarily stores data, and input and output ports and a communication port (not shown). The hybrid ECU 70 receives an ignition signal from an ignition switch 80, a shift position SP from a shift position sensor 82 that detects the operation position of a shift lever 81, an accelerator pedal operation amount Acc from an accelerator pedal position sensor 84 that detects the amount that an accelerator pedal 83 is depressed, a brake pedal position BP from a brake pedal position sensor 86 that detects the amount that a brake pedal 85 is depressed, a vehicle speed V from a vehicle speed sensor 88, and so on, via the input port. The hybrid ECU 70 is connected to the engine ECU 24, the motor ECU 40, and the battery ECU 52 via the communication port as described above, and exchanges various control signals and data with the engine ECU 24, the motor ECU 40, and the battery ECU 52.

In the hybrid vehicle 20 of this embodiment, the required torque level to be output to the ring gear shaft 32a is calculated based on the accelerator pedal operation amount Acc that corresponds to the amount that the accelerator pedal 83 is depressed by the driver and the vehicle speed V, and the operation of the engine 22 and the motors MG1 and MG2 is controlled so that a required power level that corresponds to the required torque level is output to the ring gear shaft 32a. Operating modes for the engine 22 and the motors MG1 and MG2 include a torque conversion operation mode, a charge-discharge operation mode, and a motor operation mode. In the torque conversion operation mode, the operation of the engine 22 is controlled so that a power level matching the required power level is output from the engine 22, and the driving of the motors MG1 and MG2 is controlled so that the entire power output from the engine 22 is converted into torque and output to the ring gear shaft 32a by the power distribution-integration mechanism 30 and the motors MG1 and MG2. In the charge-discharge operation mode, the operation of the engine 22 is controlled so that a power level matching the sum of the required power level and an electric power level necessary to charge or discharge the battery 50 is output from the engine 22, and the driving of the motors MG1 and motor MG2 is controlled such that all or some of the power output from the engine 22 while the battery 50 is charged or discharged is converted into torque by the power distribution-integration mechanism 30 and the motors MG1 and MG2 so that the required power level is output to the ring gear shaft 32a. In the motor operation mode, the engine 22 is stopped, and the operation of the motor MG2 is controlled so that a power level matching the required power level from the motor MG2 is output to the ring gear shaft 32a.

Figure 2:
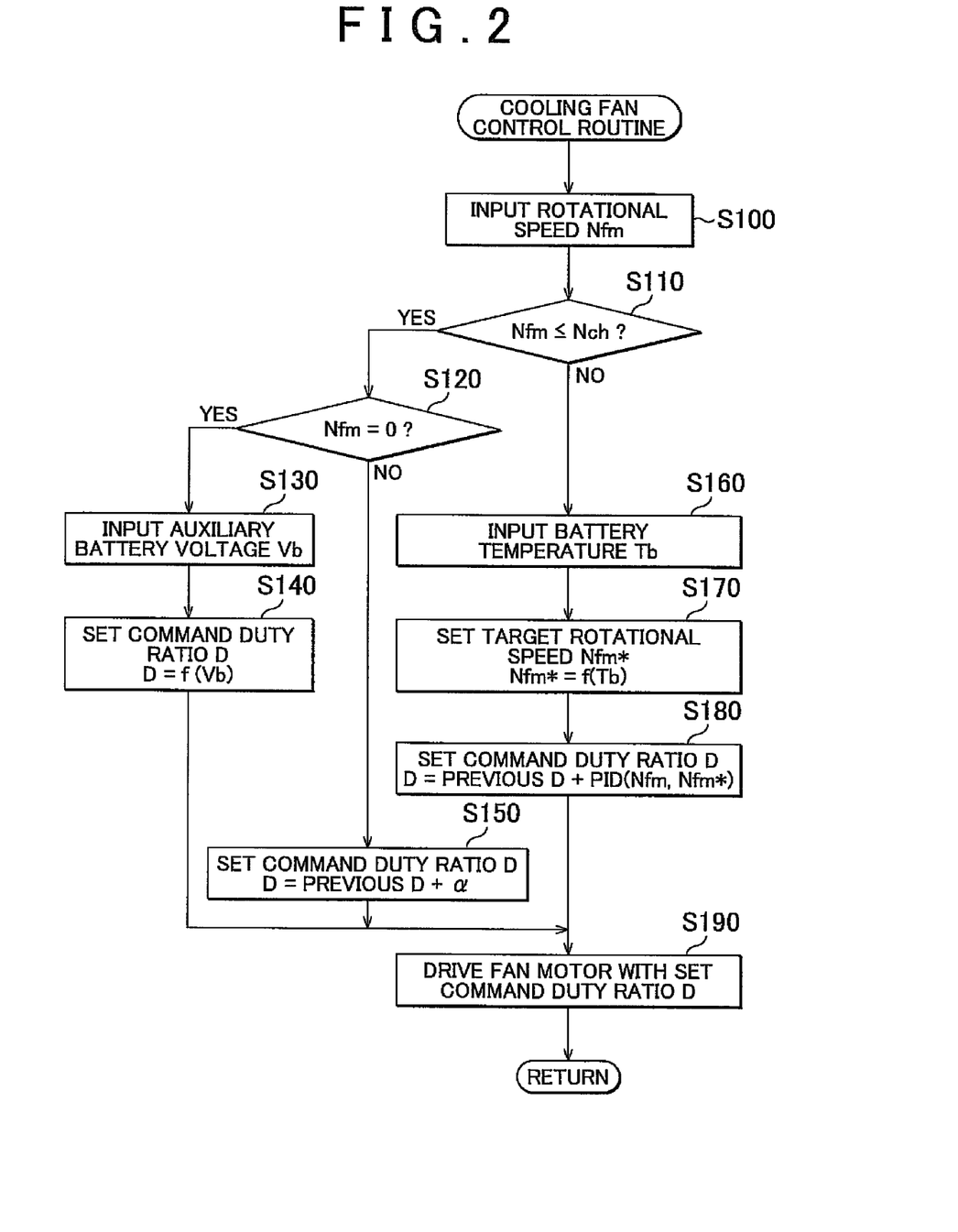
FIG. 2 is a flowchart that shows a cooling fan control routine executed by a battery ECU 52.

Next, the operation of the hybrid vehicle 20, particularly when the battery 50 is cooled by the cooling fan 55, will be described. FIG. 2 is a flowchart that shows a cooling fan control that is executed by a battery ECU 52. The routine is repeatedly executed at regular time intervals after the battery temperature Tb of the battery 50 detected by the temperature sensor 51 reaches at least a specified control initiation temperature until the battery temperature Tb falls below a control termination temperature, which is lower than the control starting temperature.

When the cooling fan control is started, the CPU 52a of the battery ECU 52 first receives the rotational speed Nfm of the fan motor 55a detected by the rotational speed sensor 59 (step S100), and compares the detected rotational speed Nfm with a predetermined control switching rotational speed (hereinafter "control switching speed") Nch (step S110). Here, the control-switching speed Nch is the rotational speed at which the control mode of the cooling fan 55 is switched, and may be determined empirically so that the rotational speed does not change suddenly before and after the control mode is switched. In this embodiment, a rotational speed that is above the rotational speed at which the fan motor 55a may be determined to be reliably activated, but below the minimum value of the target rotational speed Nfm*, which is described later, may be set as the control-switching speed Nch.

Figure 3:
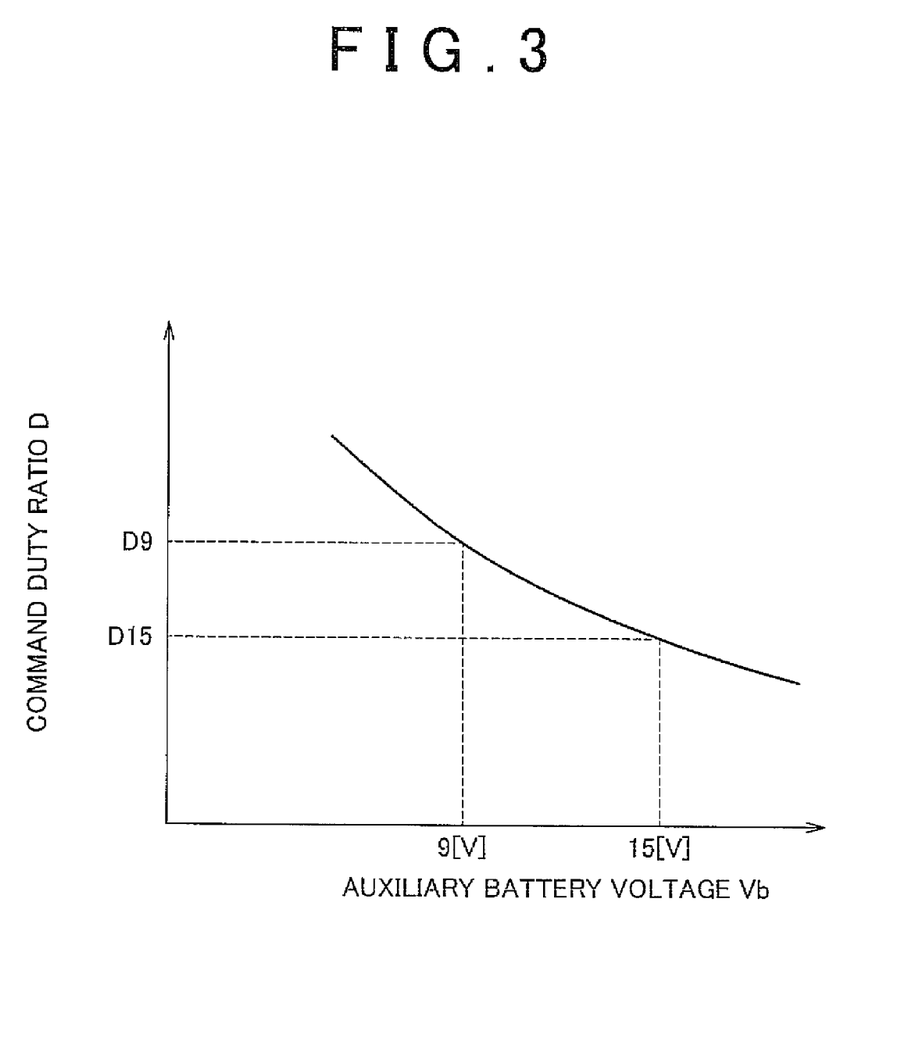
FIG. 3 is an explanatory view that illustrates a command duty ratio setting map.

The rotational speed Nfm of the fan motor 55a is compared with the control-switching speed Nch, and, if the rotational speed Nfm is equal to or below the control-switching speed Nch, it is determined whether the rotational speed Nfm of the fan motor 55a has a value of 0 (step S120). If the rotational speed Nfm of the fan motor 55a is 0, that is, control of the cooling fan 55 is started, the auxiliary battery voltage Vb from the voltage sensor 58 is input (step S130) and a command duty ratio D used to start the control of the cooling fan 55 is set based on the auxiliary battery voltage Vb (step S140). Then, a switching control signal is transmitted to the switching circuit 56 so that the fan motor 55a is driven using the duty ratio D set as described above (step S190), and the cooling fan control is terminated. Here, the command duty ratio D, which is set in step S140, is set to the lower limit value of the duty ratio D at which the fan motor 55a may be reliably activated at the auxiliary battery voltage Vb or a value slightly greater than the lower limit value. In this embodiment, a command duty ratio setting map, in which the relationship between the auxiliary battery voltage Vb and the command duty ratio D has been previously defined, is stored in the ROM 52b, and, when an auxiliary battery voltage Vb is given, a corresponding command duty ratio D is set based on the stored map. FIG. 3 shows an example of the command duty ratio setting map. The command duty ratio setting map of the embodiment shown in FIG. 3 is defined such that the higher the detected auxiliary battery voltage Vb is, the lower the command duty ratio D that is set so that the effective voltage when the driving of the fan motor 55a is started may be generally constant, regardless of the auxiliary battery voltage Vb. If the command duty ratio setting map is used, the rotational speed Nfm when the driving of the fan motor 55a is started may be also generally constant, regardless of the auxiliary battery voltage Vb. Therefore, when the cooling fan control is started, the effective voltage of the electric power to drive the fan motor 55a is sufficient to prevent the output torque of the fan motor 55a from being too low, even if the auxiliary battery voltage Vb is relatively low (for example, 9V). In addition, the effective voltage of the electric power to drive the fan motor 55a is low enough to prevent the output torque of the fan motor 55a from increasing excessively when the fan motor 55a is activated, even if the auxiliary battery voltage Vb is relatively high (for example, 15V).

Accordingly, the fan motor control is started. If it is determined that the rotational speed Nfm of the fan motor 55a is above 0 in step S120, the value obtained by adding a predetermined rate value α to the command duty ratio D, set during the preceding execution of the routine (previous duty ratio D), is set as the command duty ratio D (step S150) and a switching control signal is transmitted to the switching circuit 56 so that the fan motor 55a is driven with the command duty ratio D, set as described above (step S190). Then, the cooling fan control is terminated. Here, the rate value α may be set to a value at which the rotational speed Nfm of the fan motor 55a is gradually increased by the rate operation based on an experimental result or the like. Because the command duty ratio D is set as described above, the higher the auxiliary battery voltage Vb is when control of the cooling fan 55 is started, the lower the command duty ratio D that is set while the process in step S150 is carried out. Thus, an excessive increase in the rotational speed Nfm of the fan motor 55a and a resulting increase in the operating noise of the fan motor 55a and the fan blades 55b, which may annoy the passengers, is avoided.

Figure 4:
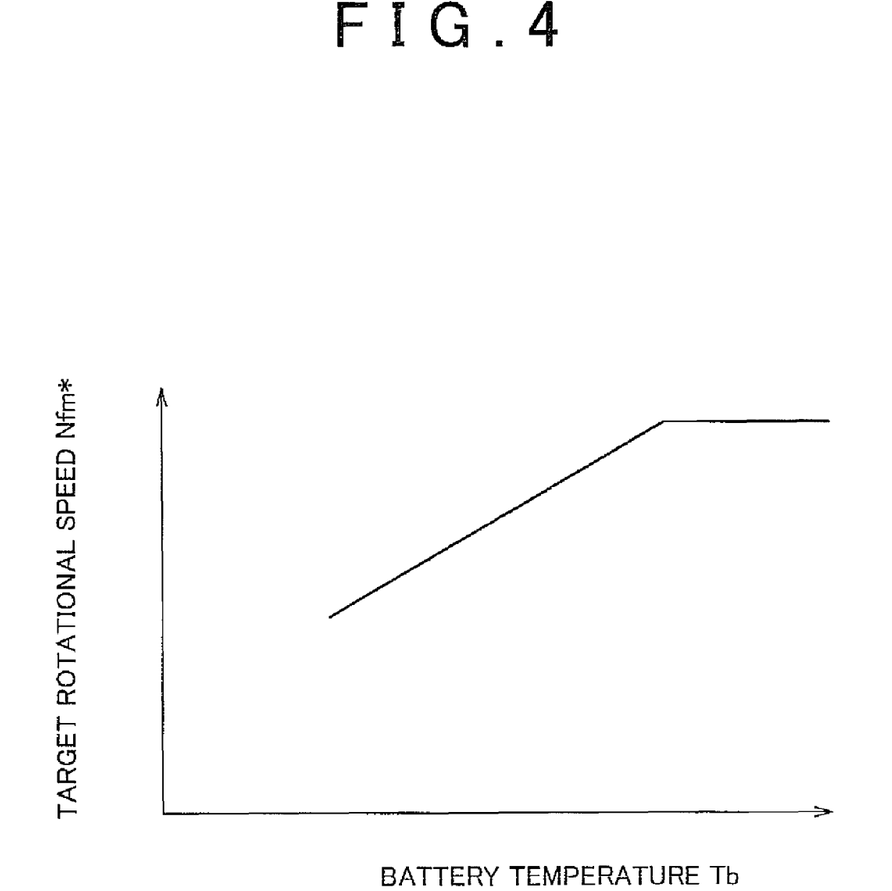
FIG. 4 is an explanatory view that illustrates a target rotational speed setting map.

The control of the cooling fan 55 as described above (steps S100 to S150 and S190) is repeated. Then, if the detected rotational speed Nfm of the fan motor 55a exceeds than the control switching rotational speed Nch (step S110), it is determined that the control mode of the cooling fan 55 should be switched. Then, the battery temperature Tb from the temperature sensor 51 is input (step S160), a target rotational speed Nfm* for the fan motor 55a is set based on the battery temperature Tb (step S170), and a command duty ratio D is set according to equation (1), shown below, which is based on the target rotational speed Nfm* and the detected rotational speed Nfm (step S180). In this embodiment, a target rotational speed setting map, in which the relationship between the battery temperature Tb and the target rotational speed Nfm* has been previously defined, is stored in the ROM 52b, and, when a battery temperature Tb is given, a corresponding target rotational speed Nfm* is obtained and set based on the stored map. FIG. 4 shows an example of a target rotational speed setting map. In this embodiment, the higher target rotational speed Nfm* is set as the battery temperature Tb increases if the battery temperature Tb is relatively low. Taking into the characteristics of the fan motor 55a, the higher target rotational speed Nfm* is set to be a constant value regardless of the battery temperature Tb, if the battery temperature Tb is equal to at least a predetermined temperature, as shown in FIG. 4. Also, equation (1) is a relational expression in a feedback control to rotate the fan motor 55a at the target rotational speed Nfm*, where "k1" represents a gain of a proportional term and "k2" represents a gain of an integral term. When the command duty ratio D is set, a control signal is transmitted to the switching circuit 56 so that the fan motor 55a is driven with the command duty ratio D (step S190), and the cooling fan control routine is terminated. After the rotational speed Nfm has reached the reference rotational speed Nch, the fan motor 55a is controlled in a feedback manner so that the rotational speed Nfm reaches the target rotational speed Nfm*. Therefore, the rotational speed Nfm is quickly brought to the target rotational speed Nfm* and the fan motor 55a rotated at the target rotational speed Nfm* suitable for cooling the battery 50 at battery temperature Tb after the rotational speed Nfm of the fan motor 55a has reached the reference rotational speed Nch.

$$D = \text{Previous}D + k1(Nfm^* - Nfm) + k2\int(Nfm^* - Nfm)dt \quad (1)$$

Figure 5:
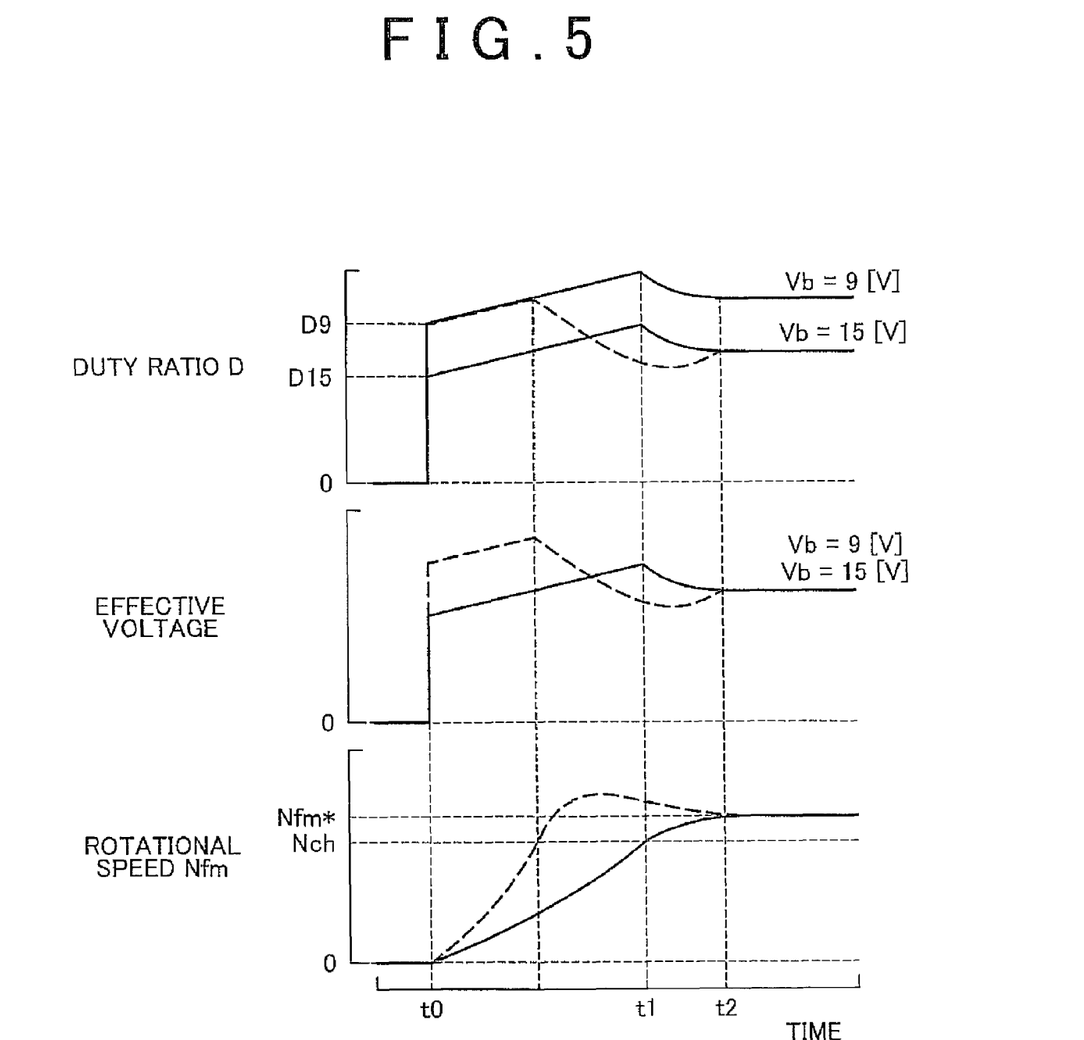
FIG. 5 is an explanatory view that illustrates changes over time in the command duty ratio D, the effective voltage of electric power to drive a fan motor 55a, and the rotational speed Nfm that are attained when the cooling fan control routine of the embodiment is executed.

FIG. 5 illustrates an example of changes over time in the command duty ratio D, the effective voltage of electric power to drive the fan motor 55a, and the rotational speed Nfm attained when the cooling fan control of the embodiment is executed. As indicated by solid lines in the drawing, execution of the cooling fan control starts at time t0, and, if the auxiliary battery voltage Vb at the start of control of the cooling fan 55 is relatively low (for example, 9V), the command duty ratio D is set to a relatively high value D9 based on the command duty ratio setting map shown in FIG. 3 and the auxiliary battery voltage Vb so that the fan motor 55a is reliably activated even if the auxiliary battery voltage Vb is relatively low. The command duty ratio D is then gradually increased by rate processing to increase the rotational speed Nfm until time t1, when the rotational speed Nfm reaches the control switching rotational speed Nch. Then, after time t1, the command duty ratio D is set through feedback control so that the rotational speed Nfm gradually approaches the target rotational speed Nfm*. However, if the auxiliary battery voltage Vb at the start of control of the cooling fan 55 is relatively high (for example, 15V), the command duty ratio D is set to a value D15, which is smaller than the value D9, based on the command duty ratio setting map shown in FIG. 3. Again, the command duty ratio D is gradually increased by rate processing until time t1, when the rotational speed Nfm reaches the reference rotational speed Nch. Then, after time t1, the command duty ratio D is set through feedback control so that the rotational speed Nfm gradually approaches the target rotational speed Nfm*. In either case, the command duty ratio D is set, at the start of control of the cooling fan 55 to a value so that the effective voltage of the fan motor 55a generally remains constant, regardless of the auxiliary battery voltage Vb, and the effective voltage of the fan motor 55a is increased at a generally constant rate by subsequent rate processing, regardless of the auxiliary battery voltage Vb, until the rotational speed Nfm reaches the reference rotational speed Nch. Therefore, in this embodiment, it is possible to activate the fan motor 55a more reliably and to prevent excessive operating noise of the fan motor 55a when the fan motor 55a is activated. It should be noted that when the value D9, which enables the fan motor 55a to be reliably activated even if the auxiliary battery voltage Vb is relatively low, is used as the command duty ratio D the rotational speed Nfm of the fan motor 55a may suddenly increases beyond the target rotational speed Nfm as the effective voltage increases as indicated by broken lines in the drawing and excessive operating noise, which may annoy the passengers, may be generated.

In the hybrid vehicle 20, the fan motor 55a is controlled via the switching circuit 56 so that air is supplied from the cooling fan 55 when the battery 50 needs to be cooled, and the switching circuit 56 is controlled so that the higher the detected voltage Vb when the control of the cooling fan 55 is started, the lower the command duty ratio D that is set from when the battery temperature Tb has at least reached the control starting temperature until the moment when the rotational speed Nfm of the fan motor 55a reaches the control-switching speed Nch. Therefore, the effective voltage of the electric power driving the fan motor 55a is sufficient to prevent the output torque immediately after the activation of the fan motor 55a from being too low if the auxiliary battery voltage Vb at the start of control of the cooling fan 55 is relatively low, and the effective voltage of the electric power driving the fan motor 55a is low enough to prevent the output torque immediately after the activation of the fan motor 55a from excessively increasing if the auxiliary battery voltage Vb at the start of control of the cooling fan 55 is relatively high. Thus, the fan motor 55a is reliably activated and generation of excessive operating noise by the cooling fan 55, which may annoy the passengers, due to an excessive increase in the rotational speed Nfm of the fan motor 55a is avoided. In addition, because the command duty ratio D is set, through feedback control, to such a value that the rotational speed Nfm of the fan motor 55a remains equal to the target rotational speed Nfm* after the rotational speed Nfm of the fan motor 55a has reached the control-switching speed Nch, the rotational speed Nfm of the fan motor 55a may be quickly brought to the target rotational speed Nfm* and the fan motor 55a is driven at the target rotational speed Nfm* to cool the battery 50 after the control-switching speed Nch has been reached.

Although the fan motor 55a is supplied with electric power from the auxiliary battery 57 in the hybrid vehicle 20, the fan motor 55a may instead be supplied with electric power from the battery 50. In this case, the voltage of the electric power from the battery 50 is converted using a converter before the electric power is supplied to the fan motor 55a.

While the control mode is switched when the rotational speed Nfm of the fan motor 55a reaches the control switching rotational speed Nch in the hybrid vehicle 20 of this embodiment, the control mode may be switched when a predetermined period of time has elapsed after the cooling fan control routine is started.

Figure 6:
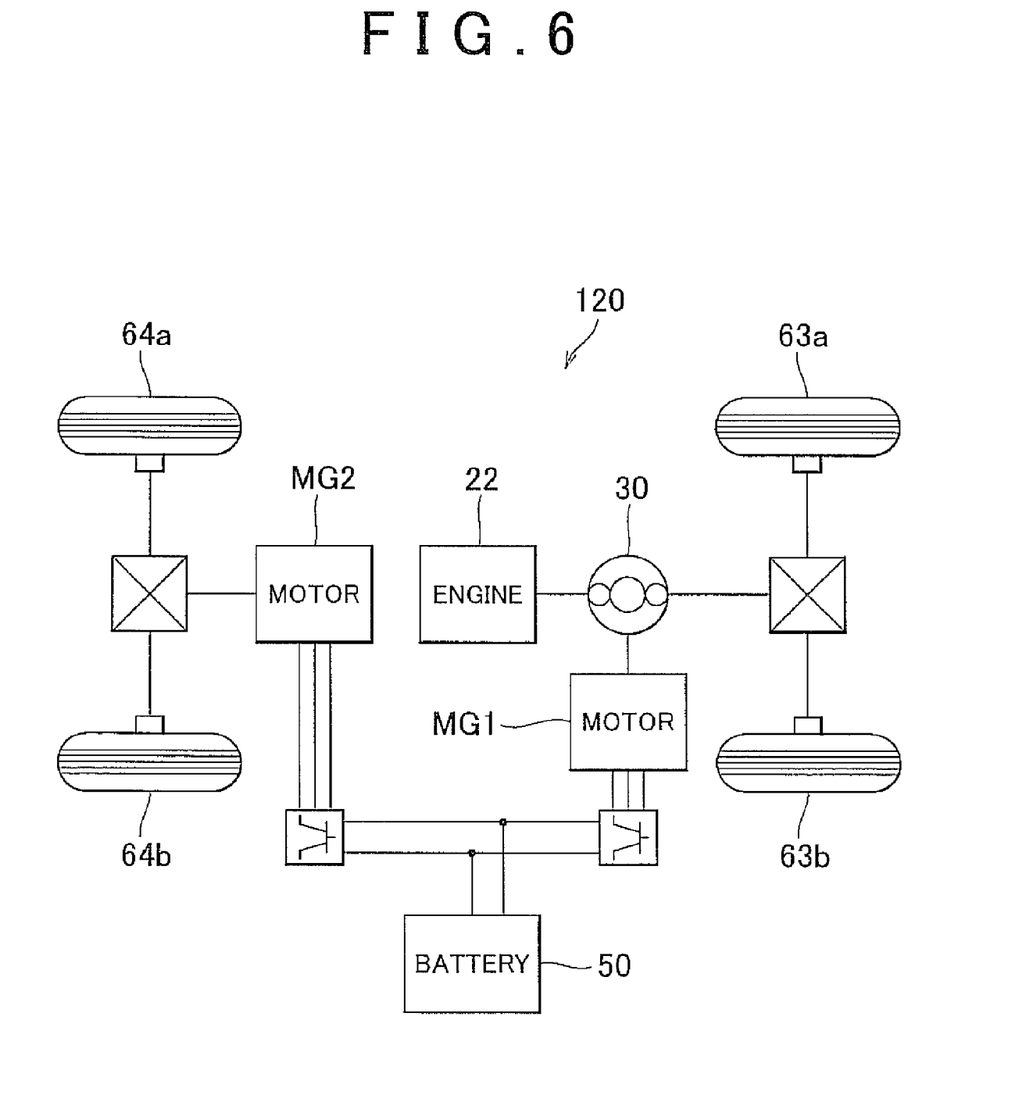
FIG. 6 is a configuration diagram that illustrates an overview of a modified configuration of the cooling system installed in a hybrid vehicle 120.

While the power from the motor MG2 is changed in speed by the reduction gear 35 and output to the ring gear shaft 32a in the hybrid vehicle 20 of this embodiment, the power from the motor MG2 may be connected to an axle (the axle connected to wheels 64a and 64b shown in FIG. 6) which is different from the axle to which the ring gear shaft 32a is connected (the axle to which the driving wheels 63a and 63b are connected) as in a hybrid vehicle 120 of a modified embodiment shown in FIG. 6.

Figure 7:
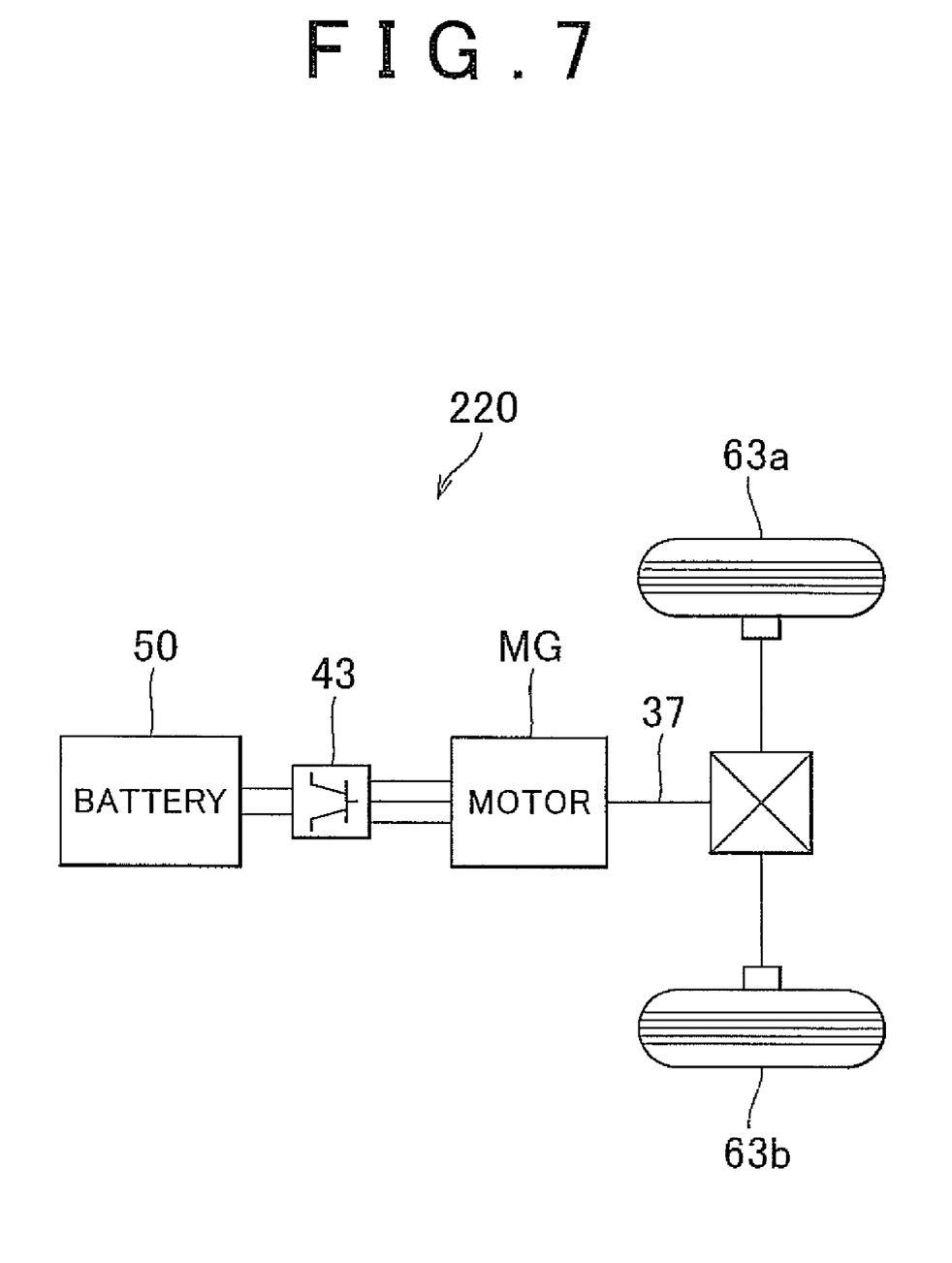
FIG. 7 is a configuration diagram that illustrates an overview of a modified configuration of the cooling system installed in configuration of an electric vehicle 220.

Also, the vehicle of the present invention may be an electric vehicle 220 that includes a motor MG as a synchronous generator-motor that is connected to the driving wheels 63a and 63b via a driving shaft 37, an inverter 43 that drives the motor MG, and a battery 50 that supplies electric power to the motor MG as shown in FIG. 7.

In this embodiment, the auxiliary battery 57 may be regarded as a "power source," the cooling fan 55 constituted of the fan motor 55a and the fan blades 55b can be regarded as an "electric fan," the switching circuit 56 provided between the auxiliary battery 57 and the fan motor 55a can be regarded as a "switching device," the voltage sensor 58 can be regarded as a "voltage detection device," and the battery ECU 52, which executes the processes in steps S100 to S150 and S190 of the cooling fan control, may be regarded as a "control device."

Here, the "power source" is not limited to the auxiliary battery 57 constituted as a lead battery with a rated output voltage of 12 V, but may be a power source of any type such as a nickel hydrogen secondary battery or lithium ion secondary battery. The "electric fan" is not limited to the cooling fan 55 including the fan motor 55a that is supplied with electric power from the auxiliary battery 57, and the fan blades 55b that is attached to the rotating shaft of the fan motor 55a, and capable of blowing air to cool the battery 50 by rotating the fan blades 55b. The electric fan may be an electric fan of any type that is driven by the electric power from the power source and is capable of blowing air to cool a target object such as one connected to the battery 50 via a converter. The "switching device" is not restricted to the switching circuit 56 that drives the fan motor 55a, but may be any suitable switching device connected the power source and the electric fan. The "voltage detection device" is not restricted to the voltage sensor 58 connected between terminals of the auxiliary battery 57, and may be of any suitable device that can detect the voltage of the power source. The "control device" is not restricted to the battery ECU 52 that executes the processes in steps S100 to S150 and S190 of the cooling fan control, but may be of any suitable device that controls the switching device so that air is supplied from the electric fan when the battery 50 is to be cooled. The "control device" also controls the switching device from the moment when the activation condition is satisfied until the moment when a predetermined cancellation condition is satisfied so that the higher the detected voltage is when the activation condition is satisfied, the lower the duty ratio is set. The blower may be a fanless blower.

While an example embodiment of the present invention has been described above, it should be understand that the present invention is not limited to the described embodiment and may be implemented in a variety of forms without departing from the scope of the present invention.

The present invention may be suitably incorporated in any cooling system or vehicle equipped with a cooling system.

What is claimed is:
1. A cooling system, comprising:
a power source;
an electric fan that is driven by the electric power from the power source and that blows air to cool a target object;
a switching device that is connected to the power source and the electric fan;
a voltage detection device that detects a voltage of the power source;
a control device that controls the switching device so that air is supplied from the electric fan when the target object is cooled and that controls the switching device from the moment when an activation condition of the electric fan is satisfied until the moment when a cancellation condition of the electric fan is satisfied so that the higher the detected voltage is when the activation condition is satisfied, the lower the duty ratio is set;
a temperature obtaining device that obtains a temperature of the target object; and
a setting device that sets a target rotational speed for the electric fan based on the obtained temperature;

wherein the activation condition is satisfied when the obtained temperature is at least equal to a specified temperature or higher, and wherein the cancellation condition is satisfied when the rotational speed of the electric fan reaches a prescribed rotational speed, which is lower than the target rotational speed.

2. The cooling system according to claim 1, wherein, when the obtained temperature is below a prescribed temperature, the setting device sets a higher target rotational speed the higher the obtained temperature is and sets a constant target rotational speed, regardless of the obtained temperature, if the obtained temperature is at least equal to the specified temperature.

3. The cooling system according to claim 1, wherein the control device sets a duty ratio so that the rotational speed of the electric fan is maintained at a target rotational speed after the cancellation condition has been satisfied and controls the switching device based on the set duty ratio.

4. The cooling system according to claim 1, wherein the duty ratio is increased after the activation condition for the electric fan is satisfied until a cancellation condition is satisfied.

5. A vehicle equipped with the cooling system according to claim 1, comprising:

an electric motor that outputs power for running; and an electric storage device that supplies electric power to and draws electric power from the electric motor, wherein the target object is the electric storage device.

6. A method for controlling a device cooling system, the method comprising:

determining whether a target object needs to be cooled;

controlling a switching device that is connected to a power source and an electric fan which is driven by electric power from the power source and capable of blowing air to cool a target object such that air can be supplied from the electric fan if it is determined that the target object needs to be cooled; and controlling the switching device from the moment when an activation condition for the electric fan is satisfied until the moment when a cancellation condition is satisfied so that the higher the detected voltage is when the activation condition is satisfied, the lower the duty ratio is set;

wherein the activation condition is satisfied if the amount of air being blown by the electric fan reaches a predetermined air supply amount, which is smaller than a target air supply amount.

7. A cooling system, comprising:

a power source;

a blower that is driven by electric power from the power source and blows air to cool a target object;

a voltage detection device that detects a voltage of the power source; and a control device that determines whether the target object needs to be cooled, and, if it is determined that the target object needs to be cooled, the control device activates the blower and controls a duty ratio of the current supplied to the blower from the power source from when the activation of the blower is started until when a predetermined condition is satisfied so that the higher the detected voltage is when the blower is activated, the lower the duty ratio is set;

wherein the predetermined condition is satisfied if the amount of air being blown by the blower reaches a predetermined air supply amount, which is smaller than a target air supply amount.

8. A method for controlling a cooling system, comprising:

determining whether a target object needs to be cooled;

activating a blower to supply air to the target object if it is determined that the target object needs to be cooled; and controlling a duty ratio of current supplied to a blower from a power source from when the blower is activated until the moment when a predetermined condition is satisfied so that the higher the detected voltage is when the blower is activated, the lower the duty ratio is set;

wherein the predetermined condition is satisfied when the amount of air being blown by the blower reaches a predetermined air supply amount, which is smaller than a target air supply amount.

* * * * *